United States Patent [19]
Oertley

[11] Patent Number: 4,818,041
[45] Date of Patent: Apr. 4, 1989

[54] IDLER WHEEL ASSEMBLY FOR TRACK-TYPE VEHICLE

[75] Inventor: Thomas E. Oertley, Dunlap, Ill.

[73] Assignee: Caterpillar Inc., Peoria, Ill.

[21] Appl. No.: 177,275

[22] Filed: Apr. 4, 1988

[51] Int. Cl.[4] .................................................. H02J 1/12
[52] U.S. Cl. ........................................ 305/56; 305/21; 305/29; 301/31; 301/11 S; 295/7; 295/20; 474/161
[58] Field of Search ............................ 305/21, 29, 56; 301/6 WB, 30, 31, 33, 34, 11 S, 10 R, 62 R, 63 R; 295/7, 11, 15, 20, 33; 474/161, 162, 163

[56] References Cited

U.S. PATENT DOCUMENTS

| | | | |
|---|---|---|---|
| Re. 30,039 | 6/1979 | Clemens et al. | 305/21 |
| 509,084 | 11/1893 | Hymas et al. | 295/20 |
| 809,398 | 1/1906 | Richards | 295/20 |
| 2,667,767 | 2/1954 | Burrell | 64/11 |
| 2,923,570 | 2/1960 | Jorn et al. | 295/11 |
| 2,954,259 | 9/1960 | Kordes | 295/11 |
| 3,127,211 | 3/1964 | Kordes et al. | 295/11 |
| 3,147,048 | 9/1964 | Johnson et al. | 308/18 |
| 3,504,562 | 4/1970 | Hirych | 74/243 |
| 3,606,497 | 9/1971 | Gilles | 305/56 |
| 3,993,356 | 11/1976 | Groff et al. | 301/6 |
| 4,069,856 | 1/1978 | Sogge | 305/21 X |
| 4,111,064 | 9/1978 | Purcell | 474/162 |

FOREIGN PATENT DOCUMENTS 1150583  8/1960  Fed. Rep. of Germany ...... 474/161

Primary Examiner—Robert B. Reeves
Assistant Examiner—Russell D. Stormer
Attorney, Agent, or Firm—Claude F. White

[57] ABSTRACT

An idler wheel assembly for a track-type vehicle has a hub member and a plurality of replaceable wear segments positioned around the circumference of the hub. A plurality of U-shaped grooves in the circumferential surface of the hub receive resilient means. The wear segments also fit within the grooves and hold the resilient means in place. A plurality of clamping members encircle the hub, overlap the wear segments, and clamp the resilient means between the wear segments and the grooves as they are secured to the hub. The wear segments are therefore resiliently isolated from the idler hub. Conventional idler wheels for track-type vehicles have exterior rims which contact the track and guide the track as the vehicle is operated. This contact between the wheel rims an the track produces objectionable noise and vibration. The subject idler wheel assembly generates low levels of noise and vibration by isolating the rims or wear segments from the wheel hub with resilient rings.

11 Claims, 2 Drawing Sheets

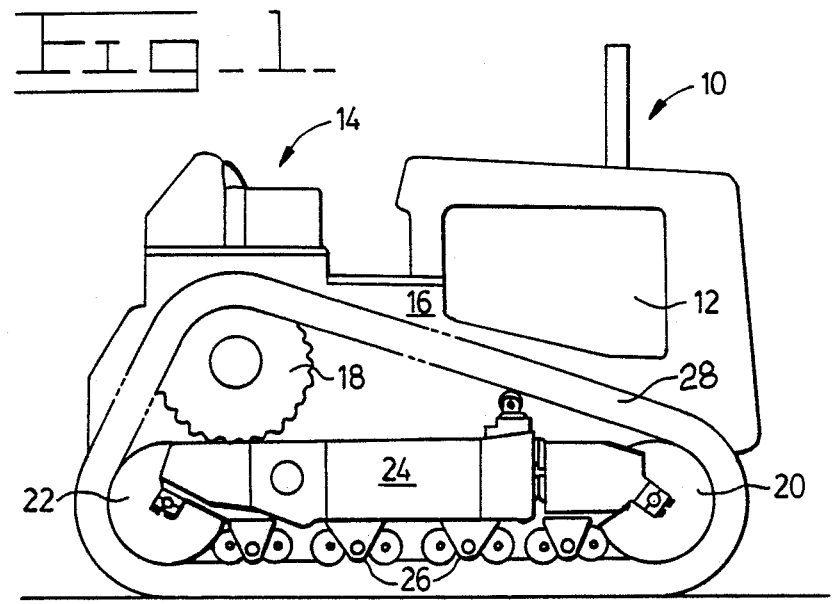
Fig_1_
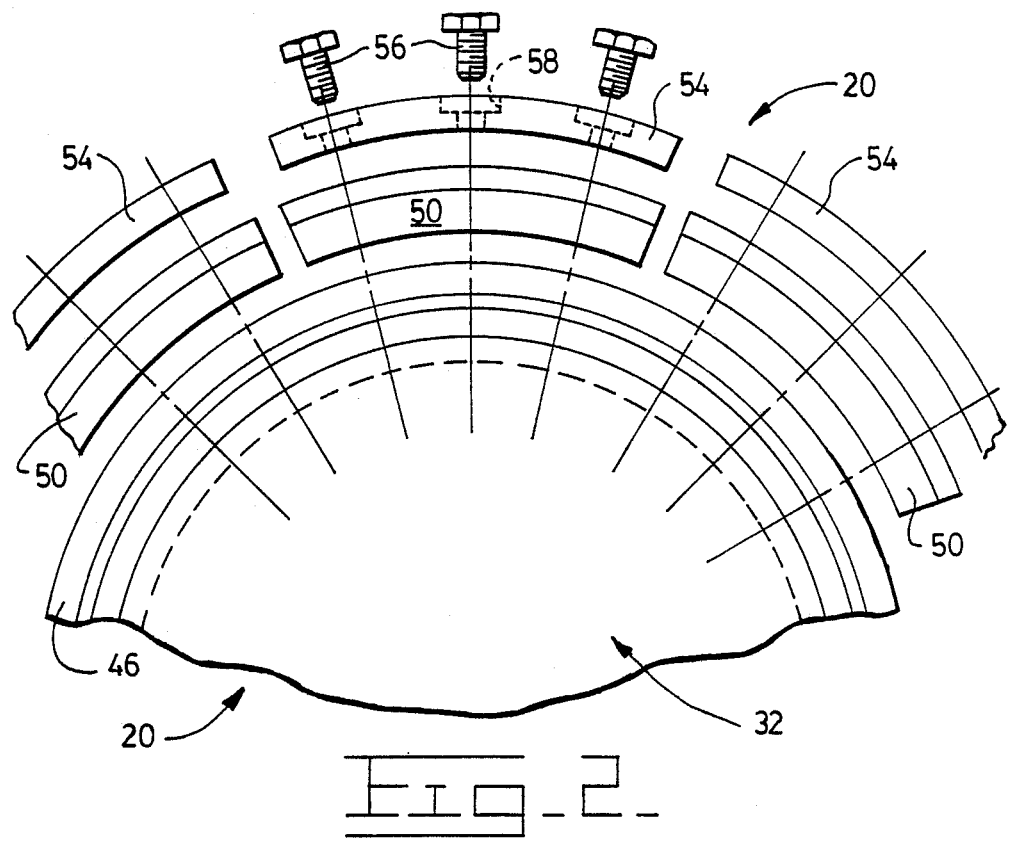
Fig_2_

IDLER WHEEL ASSEMBLY FOR TRACK-TYPE VEHICLE

TECHNICAL FIELD

This invention relates generally to an idler wheel assembly for a vehicle and, more particularly, to a wheel assembly having a plurality of individual replaceable wear segments which cooperate to form a continuous tread surface with the wear segments being resiliently isolated from the idler wheel hub.

BACKGROUND ART

Earthmoving and construction vehicles which utilize self-laying endless track chain assemblies for support and propulsion generally include one or more idler wheels for guiding and supporting portions of the track chain. Since the track chains include metal connecting links, which contact metal tread portions of the idler wheel during the track guiding function, considerable noise and vibration is generated by the metal to metal contact of the moving components.

One type of idler wheel having a plurality of replaceable rim segments and elastomeric cushioning means disposed between the rim segments and a flange of the wheel is disclosed in U.S. Pat. No. Re. 30,039, issued to D. E. Clemens, et al. on June 26, 1979. In this patent, elastomeric strips are disposed between each rim segment and the flange of the wheel. The segments are secured to the wheel flange by threaded fasteners. A clearance is provided between the bottom of the rim segments and the wheel flange. Although this arrangement functions to cushion the noise and vibrations from mating track components, the threaded fasteners could possibly work loose when the elastomeric strips compress and the clamping force of the fasteners is reduced.

Another type of cushioned wheel for track laying vehicles is disclosed in U.S. Pat. No. 3,606,497 issued to M. Gilles on Sept. 20, 1971. In this patent, the entire outer surface of the wheel is covered with a layer of elastomeric material, such as rubber. Although this arrangement would appear to sufficiently cushion the mating track components, the elastomeric material is subject to rapid wear and deterioration. It is also subject to being torn from the wheel by impact with various foreign objects.

The present invention is directed to overcoming one or more of the problems as set forth above.

DISCLOSURE OF THE INVENTION

In one aspect of the present invention, an idler wheel assembly for a track-type vehicle includes a circular hub having first and second side portions and a circumferential surface portion, with the surface portion having a central support surface, first and second contact surfaces, and first and second circumferential cavities. The idler wheel assembly further includes a plurality of first and second wear segments positioned within the first and second cavities, and resilient means located in the cavities between the hub and the wear segments. A plurality of clamping members encircle the hub and contact the wear segments and are secured to the hub by threaded fasteners.

Self-laying track-type vehicles generate considerable noise and vibration from the interaction of various moving track components. Some of these components are the track idler wheel and the track links which are guided and supported by the idler wheel. The noise is irritating to the machine operator, other workers in close proximity, and anyone else who is close to the work site. The subject invention provides a reduced noise level wheel assembly by isolating the idler wheel treads from the wheel hub with resilient rings. The invention also reduces impact forces so noise radiating from the track is less.

BRIEF DESCRIPTION OF THE DRAWINGS

FIG. 1 is a diagrammatic side elevational view of a vehicle incorporating the idler wheel assembly of the present invention;

FIG. 2 is an enlarged diagrammatic view of a portion of the idler wheel assembly of the present invention with several of the components in exploded position.

BEST MODE FOR CARRYING OUT THE INVENTION

Figure 3:
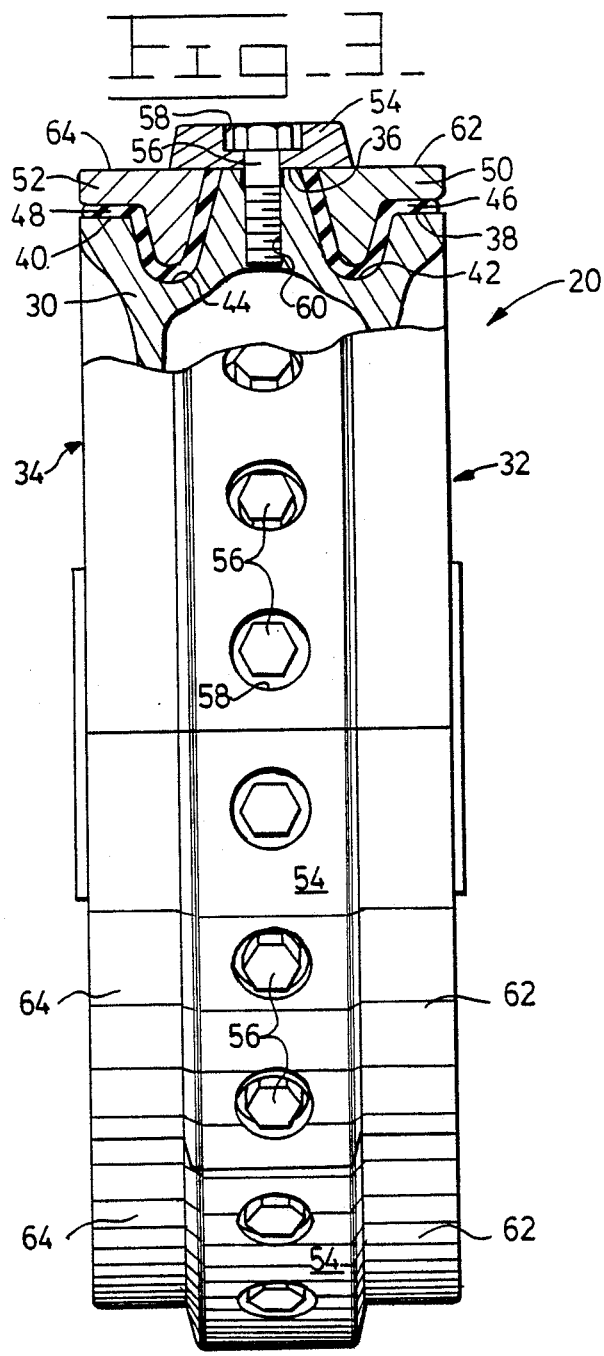
FIG. 3 is an enlarged diagrammatic plan view of the idler wheel assembly of the present invention with portions in section.

Referring to the drawings, a self-laying track-type vehicle 10 includes an engine 12, an operator's station 14, a main frame 16, a powered sprocket 18, and front and rear idler wheel assemblies 20 and 22. The main frame 16 supports a subframe 24, which in turn supports the idler wheel assemblies 20 and 22, as well as a plurality of guide roller assemblies 26. An endless track 28 is driven by the sprocket 18 and encircles the idler wheel assemblies 20,22 and the roller assemblies 26. The idler wheel assemblies 20 and 22 are substantially similar and, therefore, only the front idler assembly 20 will be described in detail.

With particular reference to FIGS. 2 and 3, the idler wheel assembly 20, which supports and guides the endless track includes a circular hub or body 30, which has first and second side portions 32 and 34, a central circumferential support surface portion 36, and first and second circumferential contact, or clamping, surfaces 38 and 40. The wheel assembly 20 further includes first and second circumferential "U" shaped grooves or cavities 42 and 44, with one cavity positioned between each of the contact surfaces 38,40 and the central support surface 36. First and second formed resilient rings 46 and 48 are located within the first and second cavities 42 and 44 respectively. The rings 46 and 48 are preferably formed of natural rubber and have a pre-formed shape which conforms substantially to the shape of the first and second cavities 42 and 44. The ring 46 is held within the cavity 42 by a plurality of hardened metal wear segments 50, and the ring 48 is held within the cavity 44 by a plurality of similar hardened metal wear segments 52. A plurality of arcuate shaped clamping plates 54 encircle the hub 30 and contact the wear segments 50 and 52. The clamping plates 54 are secured to the hub by a plurality of threaded fasteners 56 which penetrate through bores 58 in each plate 54 and engage threaded apertures 60 in the hub surface 36. As the fasteners 56 are tightly engaged with the apertures 60, the plates 54 engage the wear segments 50 and 52 and these segments compress the rubber rings 46 and 48 between the segments 50,52 and the hub cavities 42 and 44. Each of the wear segments 50,52 has a cross-sectional configuration which is substantially similar to the combined cross-sectional configuration of one of the cavities 42,44 and one of the adjacent contact surfaces 38,40.

When the wear segments 50 are secured in place in the hub cavity 42, they form a first continuous hardened tread surface 62. Likewise, the wear segments 52 form a second continuous hardened tread surface 64. As the track 28 runs around these tread surfaces 62,64, the resilient rings 46,48 are slightly compressed between the wear segments 50,52 and the hub 30. As is evident from FIG. 3, each of the clamping plates 54 overlaps a portion of one of the wear segments 50 and a portion of one of the wear segments 52.

With particular reference to FIG. 2, it can be seen that the wear surfaces 62,64 of the wear segments 50,52 have an arcuate shape. Likewise, the external surfaces of the clamping plates 54 also have an arcuate shape. The arcuate angle of the wear segments 50,52 and the clamping plates is approximately 45°.

INDUSTRIAL APPLICABILITY

The subject idler wheel assembly 20 is particularly useful with earthmoving and construction vehicles and specifically, self-laying track-type vehicles, such as vehicle 10. Power from the engine 12 is transmitted to the sprocket 18 which rotates and drives the endless track 28. The track 28 travels around the idlers 20 and 22 and the guide roller assemblies 26.

As the metal track 28 contacts the metal wear segments 50,52, noise and vibration are generated. Because the segments 50,52 are isolated from the wheel hub 30 by the resilient rings 46,48, the noise and vibration are not transferred into the wheel hub 30, where it could be amplified. Because the noise level produced by contact between the idler wheel assembly 20 and the track 28 is lower, the vehicle can operate closer to workers and occupied buildings without being objectionable. Also, because the vibrations are damped, the life of the track 28 and vehicle components are prolonged.

Other aspects, objects, and advantages of this invention can be obtained from a study of the drawings, the disclosure, and the appended claims.

I claim:

1. An idler wheel assembly for a track-type vehicle comprising:
   a circular hub having first and second side portions and a circumferential surface portion, said surface portion having a central support surface, first and second contact surfaces, and first and second U-shaped circumferential cavities, one of said cavities positioned between one of the contact surfaces and said central support surface;
   a plurality of first wear segments positioned within said first cavity, and a plurality of second wear segments positioned within said second cavity;
   resilient means located within said cavities and positioned between said hub and said wear segments;
   a plurality of clamping members, said clamping members encircling said hub and adapted to contact said wear segments and compress said resilient means; and
   means for securing said clamping members to said central support surface of said hub.

2. The idler wheel assembly, as set forth in claim 1, wherein said resilient means includes first and second ring members having a pre-formed shape which conforms substantially to the first and second U-shaped cavities and the first and second contact surfaces respectively.

3. The idler wheel assembly, as set forth in claim 1, wherein each of said wear segments has a cross-sectional configuration which is substantially similar to the combined cross-sectional configuration of one of said cavities and one of said adjacent contact surfaces.

4. The idler wheel assembly, as set forth in claim 1, wherein each of said clamping members overlaps a portion of a first wear segment and a portion of a second wear segment.

5. The idler wheel assembly, as set forth in claim 1, wherein said plurality of first wear segments forms a first continuous circular tread surface and said plurality of second wear segments form a second continuous circular tread surface.

6. The idler wheel assembly, as set forth in claim 1, wherein each of said clamping members has a plurality of through bores and said securing means includes a plurality of threaded apertures in said central support surface and a plurality of threaded fasteners, said fasteners adapted to penetrate said through bores and engage said threaded apertures.

7. The idler wheel assembly, as set forth in claim 1, wherein said resilient means includes first and second rings of natural rubber.

8. The idler wheel assembly, as set forth in claim 1, wherein each of said clamping members has an external arcuate surface portion bounded by an angle of about 45°.

9. The idler wheel assembly, as set forth in claim 1, wherein each segment of said first and second wear segments includes a hardened wear surface.

10. The idler wheel assembly, as set forth in claim 9, wherein said wear surface of each wear segment has an arcuate shape bounded by an angle of about 45°.

11. A wheel assembly for supporting and guiding an endless track of a self-laying track-type vehicle comprising:
    a circular body having first and second sides, a circumferential support surface, first and second circumferential clamping surfaces, and first and second circumferential grooves, one groove positioned between one of said clamping surfaces and said support surface;
    a plurality of first hardened metal wear segments positioned within said first groove and a plurality of second hardened metal wear segments positioned within said second groove;
    first and second formed rubber rings positioned within said first and second grooves respectively and between said body and said first and second wear segments;
    a plurality of arcuate shaped clamping plates, said plates encircling said body and adapted to contact said wear segments and said support surface; and
    a plurality of threaded fasteners adapted to secure said clamping plates, said wear segments, and said rubber rings to said circular body.

* * * * *